Patented Feb. 21, 1928.

1,659,790

UNITED STATES PATENT OFFICE.

JOEL STARRELS, OF CHICAGO, ILLINOIS.

METHOD OF PRODUCING COMMERCIAL STEARIC ACID.

No Drawing.   Application filed October 15, 1923.   Serial No. 668,498.

The present invention relates to methods of producing commercial stearic acid.

It is common practice at the present time in the manufacture of stearic acid to use expensive seeding and pressing methods to produce stearic acid from fats. Other processes have been suggested which accomplish this end by using hydrogenated oils or fats, but in order to completely saturate the oil or fat at a reasonable cost it is necessary that the color of the former be light and the free fatty acid low. Fats meeting these specifications are relatively high in price.

An object of the present invention is to provide a method which permits the utilization of dark colored fats which are high in free fatty acid.

A further object is to reduce the cost and to greatly simplify the production of stearic acid.

Further objects will appear as the description proceeds.

According to the present invention, dark colored low grade fats, which are high in free fatty acids, are esterified. Esterification may be preceded by a process of separating the glycerine from the fatty acids, as for instance, by the Twitchell or by the autoclaving process. The fatty acids resulting from such process may then be esterified by causing them to combine with alcohol, the alcohol taking the place of the glycerine in the original fats; or, if preferred, the dark colored fats high in free fatty acid, may be treated with alcohol and esterified directly without the preliminary fat splitting.

Esterification may be carried out by adding an amount of alcohol in excess of the theoretical amount necessary to completely esterify the fatty acids present in the presence of a catalyst. I have found that 1% to 2% of concentrated sulphuric acid will act satisfactorily as a catalyzer in causing esterification. Either methyl or ethyl alcohol may be used in the process of esterification, because of their relatively low cost and low boiling points, through other alcohols may be utilized. In the esterification process, the mixture referred to is heated and preferably mechanically agitated. The resulting vapors are preferably passed through a reflux condenser or column still.

Passing the vapors through a still helps to separate the water from the alcohol, the water being discarded and the alcohol returned to the reaction vessel. The removal of the water aids the reaction and shortens the time necessary for the completion of the reaction. When, as referred to above, glycerides are being esterified, the glycerine is liberated, which remains in the reaction vessel and must later be removed. Such removal may be accomplished by the addition of water and draining off the solution which is commonly called "sweet water".

When esterification has been completed and the free fatty acid reduced to a small amount, as for instance, 1% to 2%, the mineral acid is removed and the last traces neutralized; then the excess alcohol is distilled from the esters. After having been freed from all excess alcohol, the esters are distilled under vacuum. The distillation may be carried out in the presence of superheated steam, if desired, though this should be very carefully done if a low free fatty acid content is required in the distillate. The presence of any moisture at an elevated temperature would tend to split the esters.

As is well known, when fatty acids are distilled there is a tar loss of considerable proportion due to the neutral fat usually present in the fatty acid and due further to the decomposition of the fatty acids themselves at the high temperature required for distillation. The esters on the other hand, distill at a much lower temperature and loss due to decomposition is low.

The distilled esters are subjected to a process of hydrogenation and the iodine number materially reduced as, for example, an iodine number approximately 2. Because of the low free fatty acid and the light color, the hydrogenation can be carried on with little catalyzer and without much poisoning to the latter. The hardened esters, after being filtered from the catalyzer, are then saponified or split and the alcohol which is liberated condensed and used over again in the process. The liberated fatty acid is very light in color and may be sold as commercial stearic acid.

It may be noted that it is desirable to use a mixture of fats, according to the process of the present invention, which will give a fatty acid mixture such that after hydrogenation the mixed fatty acids will have a titre of about 55 to 56 degrees C.

According to the present invention, low grade fats may be utilized for the production of commercial stearic acid, the only requisite being that there be a high percentage of saponifiable matter in the raw material.

As a specific example of the application of the present invention, 100 pounds of dark color, low grade fats which are high in free fatty acids are mixed with 100 pounds of methyl alcohol containing 2% of sulphuric acid. The mixture is heated to the boiling-point of the alcohol and is preferably mechanically agitated and the vapors are passed through a reflux condenser or a column still. When the esterification has been substantially completed so that the free fatty acid of the mixture is about 2% the mixture is allowed to settle and the acid layer drawn off at the bottom. The esters are then treated with barium carbonate or other alkali to neutralize the free acid. It is then washed with water in order to remove the glycerine and the excess of alcohol. The esters are heated to remove the last traces of free alcohol and are then transferred to a still. The distillation of the esters takes place under vacuum and superheated steam. The temperature does not have to exceed 225° centigrade. The distillation commences at 160° centigrade and constant temperature is maintained as long as distillate is produced at the particular temperature. The impurities contained in the original fat remain in the still and the pure esters which have been distilled are now ready for hydrogenation. This is effected by placing the esters in a hydrogenation vessel to which has been added ½% of nickel catalyzer, which has been produced in one of the known ways and the mixture is heated in the presence of hydrogen to 180° centigrade for several hours until the iodine number of the esters has been reduced to around 2. The hydrogenated esters are then filtered from the catalyzer and are ready for splitting. The splitting may be carried out in an autoclave, the liberated alcohol being passed through a condenser and recovered, leaving the stearic acid.

It is suggested that the original low-grade fat might be first subjected to a Twitchell or autoclave process and the resultant fatty acids then esterified. The resulting esters would be treated as above outlined.

Various modifications of the steps outlined above will occur to those skilled in the art. It is intended in this patent to cover all modifications that fall within the spirit of the scope of the invention as defined by the appended claims.

I claim:

1. In the process of producing commercial stearic acid from low grade fats containing impurities, the steps of subjecting the low grade fats containing fatty acids and glycerides to an esterifying process, whereby both the glycerides and the fatty acids are substantially completely esterified, distilling the resultant esters to separate them from the impurities, and hydrogenating the distilled esters.

2. The process of producing commercial stearic acid from low grade fats containing impurities, which consists in subjecting the low grade fats containing fatty acids and glycerides to an esterifying process, whereby both the glycerides and fatty acids are substantially completely esterified, distilling the resultant esters to separate them from the impurities, hydrogenating the distilled esters, splitting said hydrogenated esters, and separating the resulting stearic acid from the alcohol.

3. The process of producing commercial stearic acid from low grade fatty acids containing impurities, which consists in substantially completely esterifying the fatty acids, distilling the resultant esters to separate them from the impurities, hydrogenating the distilled esters, splitting said hydrogenated esters, and separating the resulting stearic acid from the alcohol.

Signed at Chicago, Illinois, this 11th day of October, 1923.

JOEL STARRELS.